United States Patent
Dugan et al.

(10) Patent No.: US 6,330,079 B1
(45) Date of Patent: Dec. 11, 2001

(54) INTEGRATED VOICEMAIL AND FAXMAIL PLATFORM FOR A COMMUNICATIONS SYSTEM

(75) Inventors: Andrew J. Dugan, Colorado Springs; Robert M. Wise, Black Forest; Lâm V. Há; M. Kevin McHugh, both of Colorado Springs, all of CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/924,924

(22) Filed: Sep. 8, 1997

(51) Int. Cl.[7] .............................. H04N 1/00; H04N 1/32
(52) U.S. Cl. ...................... 358/403; 358/402; 358/407; 358/442; 379/100.12; 379/100.15; 379/102.02
(58) Field of Search .................................. 358/403, 402, 358/404, 405, 407, 434–440, 442, 444, 468; 379/100.01, 100.05, 100.06, 100.12, 100.14, 100.15, 102.02, 106.01

(56) References Cited

U.S. PATENT DOCUMENTS

| | | | |
|---|---|---|---|
| 3,506,791 | 4/1970 | Halaby | 179/41 |
| 3,676,603 | 7/1972 | Budrys | 179/18 BF |
| 3,854,013 | 12/1974 | Altenburger et al. | 179/18 BE |
| 3,959,600 | 5/1976 | Sousa | 179/18 BE |
| 3,997,731 | 12/1976 | Wilmot et al. | 179/18 B |
| 4,054,756 | 10/1977 | Comella et al. | 179/18 B |
| 4,065,642 | 12/1977 | McClure | 179/18 B |
| 4,072,824 | 2/1978 | Phillips | 179/18 B |
| 4,086,438 | 4/1978 | Kahn et al. | 179/18 BE |
| 4,266,098 | 5/1981 | Novak | 179/5.5 |
| 4,277,649 | 7/1981 | Sheinbein | 179/18 B |
| 4,278,844 | 7/1981 | Jones | 179/18 B |
| 4,313,035 | 1/1982 | Jordan et al. | 179/18 BE |
| 4,369,339 | 1/1983 | Castro et al. | 179/84 C |

(List continued on next page.)

FOREIGN PATENT DOCUMENTS

| | | |
|---|---|---|
| 0152908 | 8/1985 | (EP) . |
| 0216381 | 4/1987 | (EP) . |
| 0216515 | 4/1987 | (EP) . |
| 0330441 | 8/1989 | (EP) . |
| 2198910 | 6/1988 | (GB) . |

OTHER PUBLICATIONS

Kopec et al., "Electronic Business Telephone," *GTE Automatic Electric Journal,* Mar. 1981, pp. 34–40.

An et al., "Direct Dialing of Credit Card Calls," 1981 International Conference on Communications, Denver, Colorado, Jun. 1981, pp. 44.1.1–44.1.5.

Product Reference Guide: "SR 1000 PBX Digital Private Branch Exchange," Solid State Systems Inc., Nov. 1987.

Perkins, Ed, How to Get Big Discounts on Airfares, Hotels, Car Rentals, and More, *Consumer Reports 1992 Travel Buying Guide,* Consumer Reports Books, Yonkers, NY 1992, pp. 293–299.

"Full–Time Fax Forwarding," *Macworld,* May 1993, p. 81.

Rosenbaum, Ron, "Secrets of the Little Blue Box," *Esquire Magazine,* Oct. 1971, p. 116.

User's Guide for the LOGOS ES1 by Logotronix, Boulder, Colorado.

Primary Examiner—Kimberly A. Williams

(57) ABSTRACT

A platform for use in a communications system integrates voicemail and faxmail functionality. The platform collects, stores, and retrieves voicemail and faxmail messages for numerous subscribers. Each subscriber accesses his or her account with, for example, a single telephone number assigned to the subscriber. The integrated voicemail and faxmail platform collects, stores, forwards, distributes, saves, deletes, and retrieves voicemail and faxmail messages for the numerous subscribers based on the single number. The platform also provides capability for enhanced features such as automatic callback to individuals who leave a message for a subscriber, broadcasting of fax messages to multiple recipients, and the creation and management of distribution lists for voicemail and faxmail messages.

30 Claims, 6 Drawing Sheets

U.S. PATENT DOCUMENTS

| | | | |
|---|---|---|---|
| 4,420,656 | 12/1983 | Freeman | 179/6.04 |
| 4,475,009 | 10/1984 | Rais et al. | 179/2 A |
| 4,488,005 | 12/1984 | Frantz | 179/18 B |
| 4,578,540 | 3/1986 | Borg et al. | 179/2 A |
| 4,591,664 | 5/1986 | Freeman | 179/6.06 |
| 4,611,094 | 9/1986 | Asmuth et al. | 179/7.1 TP |
| 4,611,096 | 9/1986 | Asmuth et al. | 179/18 B |
| 4,625,081 | 11/1986 | Lotito et al. | 379/88 |
| 4,670,628 | 6/1987 | Boratgis et al. | 379/69 |
| 4,674,115 | 6/1987 | Kaleita et al. | 379/201 |
| 4,737,976 | 4/1988 | Borth et al. | 379/58 |
| 4,747,124 | 5/1988 | Ladd | 379/67 |
| 4,752,951 | 6/1988 | Konneker | 379/211 |
| 4,783,796 | 11/1988 | Ladd | 379/67 |
| 4,814,763 | 3/1989 | Nelson et al. | 340/825.44 |
| 4,821,308 | 4/1989 | Hashimoto | 379/57 |
| 4,823,123 | 4/1989 | Siwiak | 340/825.44 |
| 4,847,890 | 7/1989 | Solomon et al. | 379/6.7 |
| 4,875,038 | 10/1989 | Siwiak et al. | 340/825.44 |
| 4,878,240 | 10/1989 | Lin et al. | 379/67 |
| 4,893,329 | 1/1990 | O'Brien | 379/88 |
| 4,893,335 | 1/1990 | Fuller et al. | 379/200 |
| 4,899,373 | 2/1990 | Lee et al. | 379/207 |
| 4,920,562 | 4/1990 | Hird et al. | 379/132 |
| 4,926,462 | 5/1990 | Ladd et al. | 379/67 |
| 4,932,042 | 6/1990 | Baral et al. | 379/67 |
| 4,933,965 | 6/1990 | Hird et al. | 379/112 |
| 4,935,956 | 6/1990 | Hellwarth et al. | 379/112 |
| 4,942,598 | 7/1990 | Davis | 379/57 |
| 4,955,047 | 9/1990 | Morganstein et al. | 379/112 |
| 5,020,095 | 5/1991 | Morganstein et al. | 379/67 |
| 5,027,384 | 6/1991 | Morganstein | 379/67 |
| 5,029,196 | 7/1991 | Morganstein | 379/67 |
| 5,063,588 | 11/1991 | Patsiokas et al. | 379/57 |
| 5,090,051 | 2/1992 | Muppidi et al. | 379/61 |
| 5,151,929 | 9/1992 | Wolf | 379/57 |
| 5,193,110 | 3/1993 | Jones et al. | 379/94 |
| 5,199,062 | 3/1993 | Von Meister et al. | 379/67 |
| 5,200,993 * | 4/1993 | Wheeler et al. | 379/96 |
| 5,222,120 | 6/1993 | McLeod et al. | 379/88 |
| 5,222,125 | 6/1993 | Creswell et al. | 379/67 |
| 5,260,986 | 11/1993 | Pershan | 379/57 |
| 5,265,157 * | 11/1993 | Jolissaint et al. | 379/386 |
| 5,276,731 | 1/1994 | Arbel et al. | 379/88 |
| 5,307,399 | 4/1994 | Dai et al. | 379/57 |
| 5,315,636 | 5/1994 | Patel | 379/58 |
| 5,375,161 | 12/1994 | Fuller et al. | 379/57 |
| 5,384,831 | 1/1995 | Creswell et al. | 379/67 |
| 5,394,463 | 2/1995 | Fischell et al. | 379/201 |
| 5,406,557 * | 4/1995 | Baudoin | 370/61 |
| 5,450,479 | 9/1995 | Alesio et al. | 379/144 |
| 5,454,032 * | 9/1995 | Pinard et al. | 379/167 |
| 5,524,146 * | 6/1996 | Morrisey et al. | 379/207 |
| 5,588,037 | 12/1996 | Fuller et al. | 379/57 |
| 5,621,727 * | 4/1997 | Vaudreuil | 370/60 |
| 5,657,461 * | 8/1997 | Harkins et al. | 395/333 |
| 5,675,507 * | 10/1997 | Bobo, II | 364/514 |
| 5,689,642 * | 11/1997 | Harkins et al. | 395/200.04 |
| 5,740,230 * | 4/1998 | Vaudreuil | 379/88 |
| 5,740,231 * | 4/1998 | Cohn et al. | 379/89 |
| 5,742,763 * | 4/1998 | Jones | 395/200.3 |
| 5,764,750 * | 6/1998 | Chau et al. | 379/229 |
| 5,767,985 * | 6/1998 | Yamamoto et al. | 358/402 |
| 5,790,806 * | 8/1998 | Koperda | 395/200.82 |
| 5,862,202 * | 1/1999 | Bashoura et al. | 379/100.14 |
| 5,870,454 * | 2/1999 | Dahlen | 379/88.14 |
| 5,896,441 * | 4/1999 | Akazawa et al. | 379/9 |
| 5,898,667 * | 4/1999 | Longfield et al. | 370/225 |
| 5,905,777 * | 5/1999 | Foladare et al. | 379/90.01 |
| 5,930,348 * | 7/1999 | Regnier et al. | 379/221 |
| 5,987,110 * | 11/1999 | Malik et al. | 379/196 |
| 6,072,862 * | 6/2000 | Srinivasan | 379/100.08 |
| 6,167,123 * | 12/2000 | Kwok et al. | 379/100.01 |

* cited by examiner

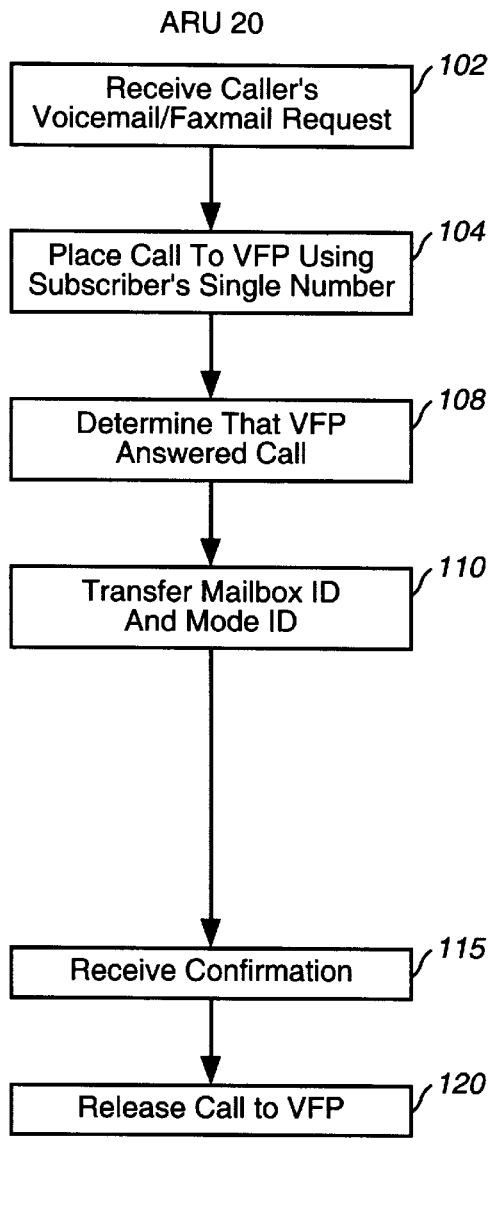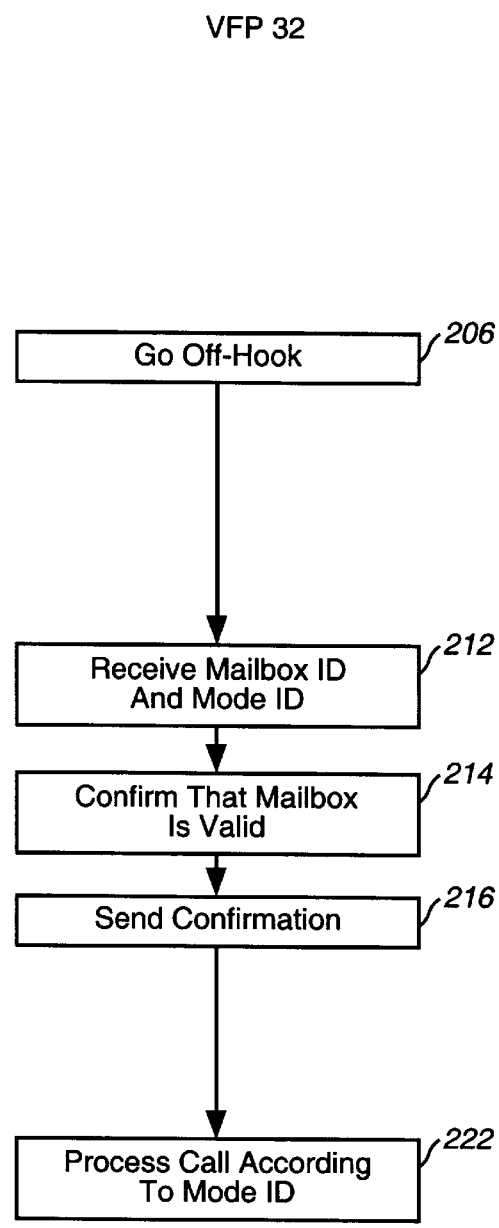
FIG. 4A
FIG. 4B

INTEGRATED VOICEMAIL AND FAXMAIL PLATFORM FOR A COMMUNICATIONS SYSTEM

TECHNICAL FIELD

The present invention relates generally to telecommunications systems and more particularly to managing services in telecommunications systems such as systems having single telephone number access to multiple communications services.

BACKGROUND OF THE INVENTION

In conventional telecommunications systems, a number of different telecommunications services are offered to subscribers. Each telecommunications service requires a unique telephone number. Examples of telecommunications services that require a unique telephone number are automatic routing services, voicemail services, facsimile services, paging services, cellular phone services, and personal 800 numbers. One of the drawbacks of each service requiring a different telephone number is that managing and publishing multiple telephone numbers for a subscriber that uses multiple communications services can prove to be quite cumbersome. For example, a subscriber may have to provide a first telephone number for facsimile services, a second telephone number for voicemail services, and a third telephone number for cellular services. Thus, a subscriber must remember all of the unique telephone numbers and must make clear to people to whom the subscriber gives the telephone numbers what services are associated with what telephone numbers. Oftentimes, a party confuses the mapping of telephone numbers to services and reaches the wrong service when dialing the telephone number that was given to the party. For instance, a caller may dial a number thinking that he will reach a person and instead the caller reaches a facsimile machine.

Another drawback of conventional systems is the lack of flexibility regarding the telecommunications services that are provided to subscribers. A subscriber may need to provide access to different services to different people at various times. For example, a subscriber may need to have phone calls directed to the subscriber's workplace during the work week but may need to have phone calls directed to his home or cellular phone on weekends. The subscriber may also wish to limit the people that may reach the subscriber by phone on the weekends. Still further, the subscriber may wish to provide other people with access to his voicemail.

Unfortunately, with conventional systems such configurability of telecommunications services is not available. Moreover, a subscriber has difficulty managing a multitude of communications services, where each service has a different number. For example, if the subscriber wishes to update multiple aspects of his or her services over a phone, multiple iterative menu selections and presentations are required. Furthermore, a caller must typically call one number to update aspects of his or her voicemail services, and then call another number to update aspects of his or her pager services. Still further numbers are required to update other telecommunications services.

Known systems have combined telecommunications services in an attempt to provide more convenient services to the user. For example, U.S. Pat. No. 5,375,161 combines some paging functions with voicemail functions. For example, the voicemail system will page the user when a voicemail has been recorded for the user. Such a system can be awkward to use, since specific codes are required to be memorized by the user for many functions. Furthermore, such a system provides only limited telecommunications services to a user. For example, no facsimile services are provided.

Another difficulty users of telecommunications services suffer from is receiving facsimile messages. Often, the user may have two office locations (e.g., a home office and a work office), with separate facsimile numbers for each. If the user receives a facsimile message at one number, the sender may believe that the user has received the message, when in fact the user is located at the other location (and at the other fax machine).

U.S. Pat. No. 5,459,584 provides a "store and forward" system for facsimile messages. Under this system, a single number is provided for receiving a user's facsimile messages. The user can then direct received facsimile messages to a desired location (e.g., to a facsimile machine located at his or her home office). As with the above described patent, the system under this patent suffers from providing only limited telecommunications services to the user. Additionally, such a system can be awkward for the user to efficiently receive facsimile messages at desired locations. For example, the user cannot provide efficient predetermined routing for facsimile messages to various locations based on a mobile user. Furthermore, the systems under both such patents provide only a limited hardware and software platform functionality. A fault effecting one component in the platform could compromise the entire platform, and thereby be practicably useless to a user.

SUMMARY OF THE INVENTION

Aspects of the present invention overcome the problems of the prior systems, and provide additional benefits, as described in detail herein. Under an exemplary embodiment of the invention, a platform for use in a communications system integrates voicemail, faxmail, video mail, email, telex and other electronic information mail services. The platform collects, stores, and retrieves messages, such as voicemail and faxmail messages, for numerous subscribers. Each subscriber accesses his or her account with, for example, a single telephone number assigned to the user. The integrated platform collects, stores, forwards, distributes, saves, deletes, and retrieves voicemail, faxmail, etc. messages for the numerous subscribers based on their single numbers. The platform also provides capability for enhanced features such as automatic callback to individuals who leave the message for a subscriber, broadcasting of faxmail messages to multiple recipients, pager notification, and the creation and management of distribution lists for messages.

Furthermore, the platform provides for redundant and expanded hardware and software functionality. As a result, the platform can handle not only a high volume of message traffic, but also ensure that faults effecting one or more components of the system do not compromise the entire platform. The platform is therefore highly reliable.

In a broad sense, an embodiment of the present invention is applicable for use in a telecommunications network. The embodiment includes several telephony network interface servers, at least two routing hubs, a centralized mass storage device, and at least two management servers. The interface servers are coupled to receive voice and facsimile messages from the telecommunications network. The routing hubs are coupled to the interface servers, while the mass storage device stores subscriber accounts. Each account is for storing the voice and facsimile messages for at least one subscriber. The management servers are coupled to the mass storage device and the routing hubs. At least one management server routes incoming voice and facsimile messages for storage in accounts within the mass storage device, while at least another management server is configured to replace functionality of the one management server if it experiences a fault.

Another embodiment of the present invention provides a method performed by a message server, such as a server for voice messages and facsimile messages. The method includes the steps of the: (a) establishing a communications link with an automated response unit (ARU) in response to a call received from the telecommunications network; (b) receiving subscriber information of requested service data, wherein the requested service data corresponds to a telecommunications service request associated with the received call; (c) determining whether a subscriber account is satisfactory based on the subscriber information or requested service data; and (d) providing a confirmation message to the automated response unit if the subscriber account is satisfactory. During the step (a) of establishing a link, the ARU typically initiates establishment of the link.

In another embodiment of the present invention, a method performed by the message server includes the steps of: (a) establishing a communications link with an automated response unit in response to a call received from the telecommunications network; (b) receiving a query from the automated response unit regarding a status of a subscriber account; (c) determining a status of the subscriber account; and (d) providing a response to the query, wherein the response indicates a current status of messages stored in the subscriber account.

BRIEF DESCRIPTION OF THE DRAWINGS

An exemplary embodiment of the present invention, will be described in more detail below relative to the following figures.

FIGS. 4A and 4B are flow diagrams showing the steps performed by an automated response unit (ARU) and voicemail/faxmail platform (VFP) of FIG. 1A, respectively, during receipt of a guest caller's voicemail/faxmail request.

DETAILED DESCRIPTION OF THE INVENTION

I. Overview

Figure 1A:
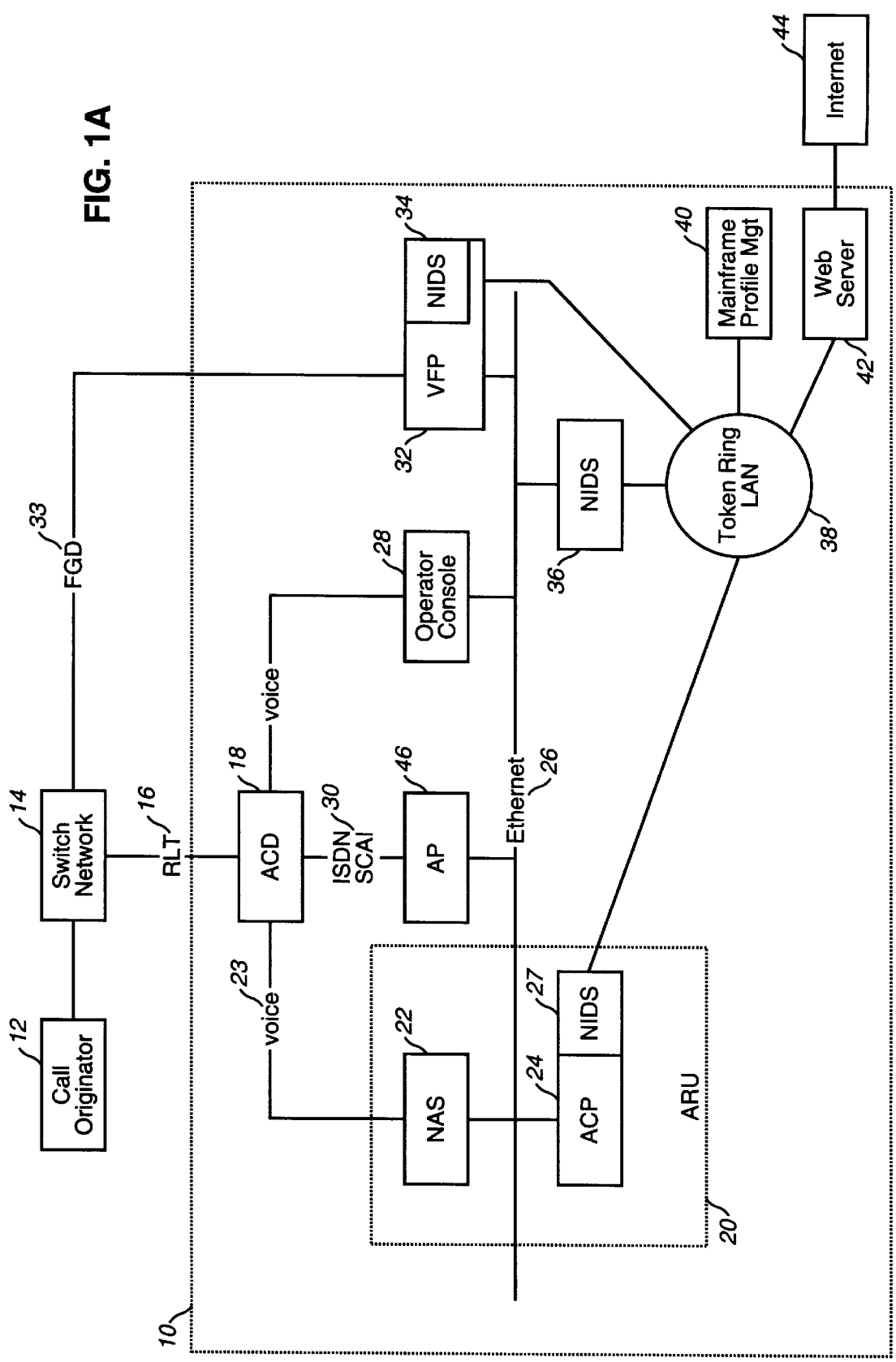
FIG. 1A is a block diagram showing a first system configuration suitable for practicing the exemplary embodiment of the present invention.

A system that overcomes problems of the prior art is described in detail in co-pending U.S. Patent Application entitled, "Single Telephone Number Access to Multiple Communications Services," filed concurrently herewith, and assigned to the assignee of the present application. As described in this application, a platform enables multiple telecommunications services to be accessible through a single telephone number. Thus, for example, access to paging services, facsimile ("fax") services, routing services, voicemail services, calling card services and personal 800 services, may be reached through a single telephone number. The subscriber has complete control over access to these services. For example, the subscriber may specify what services are available to what people at what time. Hence, a first subset of the services to which the subscriber subscribes may be available to a first party at a first time and a second subset of services may be available to a second party at a second time. Moreover, a single party may have access to different subsets of the services depending on what time it is. The platform of the exemplary embodiment of the present invention also provides the subscriber with the ability to place multiple calls from any location using the same telephone number and billing all the calls to a single account.

The subscriber is assigned a single telephone number, such as a toll free 800 number or 888 number. This single telephone number may be used by other parties ("guests") to reach the subscriber at any destination telephone number programmed by the subscriber. In addition, the single phone number may be used to send a fax to the subscriber, to leave a voicemail message for the subscriber, to leave an electronic (text) mail message, or to page the subscriber. The subscriber may also program routing so that a call placed to the single telephone number of the subscriber reaches the subscriber at multiple locations. Also, as mentioned above, different callers may reach different services. As an example, calls from certain callers may automatically cause a page to be issued or automatically placed into voicemail.

In an exemplary embodiment, a subscriber is assigned multiple personal identification numbers (PINs). Each PIN is a short sequence of numeric or alphanumeric characters or DTMF tones. Each PIN is associated with a different service configuration. One of the PINs is assigned solely for use by the subscriber, and when the subscriber calls his assigned telephone number and enters his PIN, the platform knows that it is the subscriber who is calling and offers subscriber only services. The other PINs may be assigned to different service profiles. These PINs may be distributed to appropriate parties to specify what services would be available to those parties. For example, a first PIN may be given to family members of a subscriber, whereas a second PIN may be given to business associates of the subscriber. As a result, family members will have access to a first set of services and business associates will have access to a second set of services.

Multiple outbound calls to domestic destinations or international destinations will be billed to a single account. This account may be a calling card account, a credit card account, or an account that is specially designated for this grouping of the services. As result, a subscriber need not enter a calling card number multiple times when placing multiple calls. A subscriber may also access their account to make updates to a service profile that is maintained. As an example, the subscriber may change the terminating telephone numbers that are used to reach the subscriber. Similarly, a subscriber may change which callers are sent to voicemail and which callers automatically cause a page to be sent.

Under an embodiment of the present invention, a platform is provided which permits consolidated communications services, including the collection, storage and retrieval of "electronic information messages," such as voicemail and faxmail messages. As used generally herein, a "electronic information message" is a voicemail message, faxmail message, video mail message, electronic (text/graphics) mail message (email), telex message, or other electronically, optically, magnetically or otherwise stored information data message that a third party ("caller") wishes to have recorded for later transmission or playback to the subscriber. The embodiments of the present invention are generally described herein as incorporating voicemail and faxmail messages; those skilled in the art will readily recognize that the present invention can be expanded to incorporate all electronic information messages.

An integrated voicemail and faxmail platform (VFP) embodies a subscriber's account, and can be reached with a single telephone number assigned to the subscriber. The VFP collects, stores, forwards, distributes, saves, deletes, and retrieves voicemail and faxmail messages for multiple subscribers. The VFP also provides capability for enhanced features, such as auto-callback, fax broadcast and distribution lists, as described below.

All voicemail and faxmail messages are sent to the VFP, and placed in individual subscribers' accounts. Their single numbers are then used by the subscribers to access their accounts to retrieve voicemail and faxmail messages. Subscribers can use a number of features. For example, as described herein, subscribers can store and forward messages, use distribution lists for broadcasting messages, select to automatically place a call to the guest caller who leaves a message, request faxes be sent to a certain destination number, etc. All of these services and more are provided to multiple subscribers, using the integrated VFP described herein.

II. Platform Architecture

FIG. 1A is a block diagram that illustrates a first system architecture for practicing the exemplary embodiment of the present invention, where the system architecture is part of a larger telecommunications network. The system includes a platform 10 that encompasses multiple components. FIG. 1A represents a logical view of the platform 10, which includes multiple physical systems. The platform 10 provides single telephone number access to multiple telecommunications services for a subscriber. The subscriber, in this context, is the customer to whom the single telephone number is assigned. The single telephone number may be accessed by both the subscriber and callers to the subscriber (i.e., guests). A call originator 12 depicted in FIG. 1A represents the origination of a call to the platform 10. This call may be from a subscriber or a caller who is seeking to reach the telephone number that is assigned to a subscriber. Moreover, the call may be from a facsimile machine or a computer. The call reaches a switch network 14 of the service provider in any of a number of different ways, including local exchange carrier, private line, dedicated access line, or international carrier. The switch network 14 routes the call to an automated call distributor (ACD) 18 within the platform 10 via a release link trunk (RLT) 16. The RLT 16 is a voice trunk that may be released from a call when the call is extended back to the switch network 14 by the ACD 18.

The ACD 18 routes incoming calls to the appropriate components within the platform for properly handling the calls. The ACD 18 is a conventional digital matrix switch that includes programs for performing call queuing and distribution. A suitable ACD is the Northern Telecom DMS-100.

The platform 10 also includes an Intelligent Services Network Adjunct Processor (ISNAP) or application processor (AP) 46 that is associated with the ACD 18. The AP 46 may be a dedicated computer system that provides intelligent application processing for the ACD 18. Certain functionality that may be performed by the ACD 18 is off-loaded to the AP 46 to enable the ACD to focus on performing the switching and queuing functionality. The AP 46 is linked to the ACD 18 via an Integrated Services Digital Network (ISDN) implementation of a switch/computer application interface (SCAI) link 30.

The platform 10 includes an automated response unit (ARU) 20 that provides voice response and menu routing functions to a caller. The ARU 20 facilitates caller input via selection of dual tone multi-frequency (DTMF) digits, such as by pressing keys on a telephone keypad. The ARU 20 may provide various automated menus which the caller may navigate to reach a desired service. The ARU 20 includes a network audio server (NAS) 22, which is a server computer that has a voice telephony interface to the ACD 18. The NAS 22 is linked to the ACD 18 via multiple voice trunks 23 and, in general, provides an audio interface to a caller. The ARU 20 also includes an automated call processor (ACP) 24. The ACP 24 provides intelligent call processing functions for the ARU 20. The ARU 20 is responsible for handling all initial inbound calls for the platform 10. The ACP 24 operates by executing scripts that take callers through a series of menus, accept caller input, make decisions based upon caller input, and perform actions such as the transfer of a call to another destination to provide appropriate services. The ACP 24 prompts the AP 46 or NAS 22 to play scripts or prompts to callers, to gather DTMF digit input, to play various recorded messages, and to direct the caller to other destinations. The ACP 24 may be implemented on a high-grade mid-range computer, such as the IBM RS/6000 from International Business Machines Corporation, or a DEC alpha-based computer from Digital Equipment Corporation (DEC).

The scripts executed by the ACP 24 determine which communications services to provide to a caller and then provides those services by commanding the AP 46 to transfer the call to the appropriate service provider. The scripts executed by the ACP 24 are customized to a subscriber by using a subscriber profile as input data. The subscriber profile is stored for use by the platform. The subscriber profile specifies which services are available to a subscriber and guests and which destination numbers are to be used. The subscriber profiles also identify find-me and follow-me routing, paging notification, and other subscriber configurable aspects of telecommunications services provided to the subscriber by the platform 10. The NAS 22 and ACP 24 may be linked, for example, by an Ethernet® local area network (LAN) 26 (Ethernet is a trademark of Xerox Corporation).

The platform 10 may include one or more operator consoles 28. These operator consoles 28 are specialized workstations that are operated by human operators. The operator consoles 28 may perform much of the same functionality as is performed by the ARU 20. In particular, the human operator at the operator console 28 may perform the appropriate scripts, prompting and transferring.

The platform 10 may have a voicemail/faxmail platform (VFP) 32. This platform collects, stores and manages both voicemail messages and facsimile messages. It collects voicemail and facsimile messages over T1 or Feature Group D (FGD) trunks 33 from the switch network 14. Calls that require voicemail or facsimile services are transferred to the VFP 32 from the ARU 20, as will be described in more detail below. A transfer occurs with the assistance of the ACD 18 and the switch network 14. The VFP 32 is also connected to the Ethernet LAN 26.

The platform 10 may include multiple network implementation distribution servers (NIDS) 27, 34 and 36. Each of these NIDS may be implemented as a separate computer system. The NIDS may be redundant, and generally serve the role of storing database information, including subscriber profiles. The NIDS 27, 34 and 36 may all be connected to the Ethernet LAN 26 in the system configuration depicted in FIG. 1A.

The NIDS 27 is shown as part of the ARU 20 so that the ACP 24 can directly access subscriber profiles without having to go over the Ethernet LAN 26. In general, the ACP 24 submits database queries to the NIDS 27 to obtain data on the subscriber profile. The subscriber profile is used to determine what scripts to perform for a caller, to determine what communications services can be offered to a caller, and to determine what destination telephone numbers and mailbox identifiers to use. The VFP 32 submits queries to the NIDS 34 for subscriber profile or mailbox information and processing voicemail or facsimile messages.

The VFP 32 preferably employs a relational database, such as a relational database product from Informix, for storing mailbox profiles. Additionally, the database of the VFP 32 can also store information such as broadcast lists of subscribers, group information, information on subscriber documents, information on coversheets, and information on outbound voice or facsimile jobs. Group information generally refers to groupings of mailboxes which can exchange information with each other. Information on subscriber documents include the location within the database or another database of a document (typically a facsimile document), whether it is confidential, the time received, number of pages, total bytes, priority, etc. Coversheets can be coversheets predetermined by the subscriber or service provider that precede forwarded facsimile documents. Rather than store the coversheet documents themselves, the database preferably provides pointers or path names to the location of such documents within the VFP 32 or the platform 10. Furthermore, the database can store pager profile information and templates which provide subscribers and callers more easy access to sending pager messages (e.g., phone number of pager service, specified delay, subscriber's mailbox/PIN number, etc.).

As explained herein, company information stored on the VFP 32 in its profile database is slightly different from the profile information stored on the NIDS 27 and 36. Both databases contain some common database elements, but each database is constructed specifically for the types of services provided by the associated server which accesses the database.

The NIDS 27, 34 and 36 are also interconnected via a token ring local area network (LAN) 38. This LAN 38 is used for updates that are made to subscriber profiles and to keep the databases stored on the various NIDS consistent with a centralized profile database that is maintained by the mainframe profile management system 40 (which is on a dedicated mainframe or other suitable computer system). When a modification or update is made at one NIDS 27, 34 or 36, the affected NIDS sends a message to the mainframe profile management system 40, which makes the update to the centralized profile database and then ensures that each of the profile databases on the other NIDS are updated.

The platform 10 includes one or more web servers 42 that are connected to the token ring LAN 38 to provide a web site that a subscriber may access over the Internet 44. The web page or pages at the web server 42 enables a subscriber to update the subscriber profile for the subscriber over the Internet. These updates may be forwarded to the mainframe profile management system 40, which in turn updates the information stored at the NIDS 27, 34 and 36. Alternatively, a NIDS may be resident with the web server such that the NIDS associated with the web server updates the profile information and passes the update on to the mainframe profile management system 40. Those skilled in the art will appreciate that the web server 42 may also be part of an intranet rather than the Internet. Still further, those skilled in the art will appreciate that the web server 42 may more generally be a program that provides a user interface to subscribers so that the subscribers may update service profile information via computer. Hence, a program may be a program resident on a server that is part of a distributed system such as a LAN or wide area network (WAN).

Figure 1B:
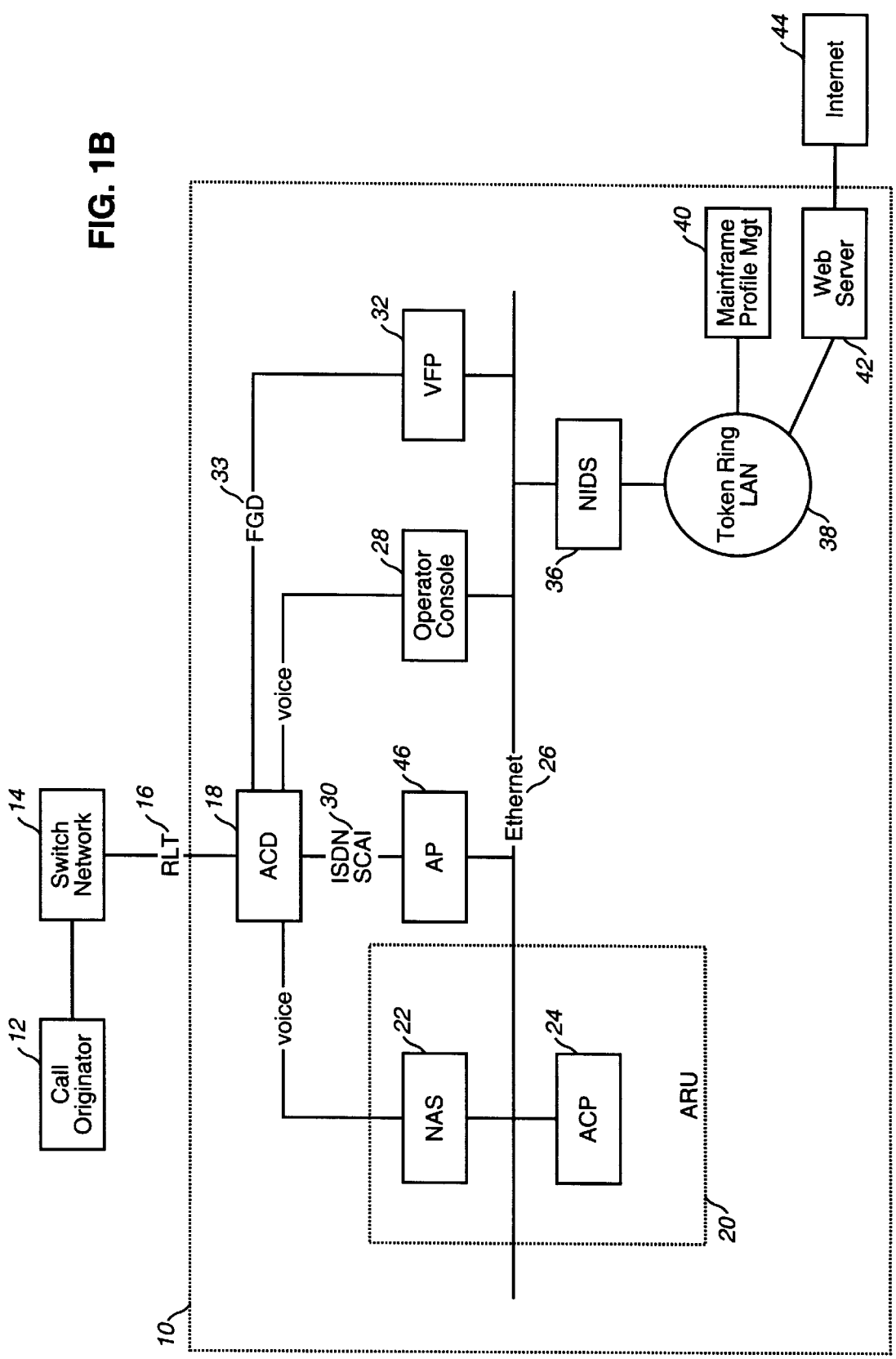
FIG. 1B is a block diagram showing a second system configuration suitable for practicing the exemplary embodiment of the present invention.

FIG. 1B shows a second system configuration that is suitable for practicing the exemplary embodiment to the present invention. This second configuration differs from the first configuration in several respects. First, there is no NIDS within the ARU and no NIDS associated with the VFP. In this second system configuration, database queries from the ACP 24 in the VFP 32 are passed over the Ethernet LAN 26 to the NIDS 36. Second, the VFP 32 is extended directly to the ACD 18 via T1 or FGD trunks 33. As a result, call transfers from the ARU 20 to the VFP 32 may be performed by the ACD 18 within the platform 10. There is no need for transferring the call outside of the platform.

Those skilled in the art will appreciate that the system configurations shown in FIGS. 1A and 1B are intended to be merely illustrative. For example, multiple platforms may be implemented within a given telecommunications system. Furthermore, multiple operator consoles 28 may be provided within the platform 10 and multiple ACDs may be provided. Each ACD may have its own associated AP. Still further, multiple ARUs may be provided within a given platform and multiple ACDs may be combined with a single VFP. Still further, the components may be connected by different types of LANs or interconnections that differ from those shown in FIGS. 1A and 1B. Additional details regarding the platform 10 and its related services are described in greater detail in copending U.S. Patent Applications entitled "Single Telephone Number Access to Multiple Communications Systems," "Multiple Routing Options In A Telecommunications Service Platform," "Outbound Calling Services On A Telecommunications Service Platform," "Integrated Messaging Platform," and "Internet-Based Subscriber Profile Management of a Communications System," which were filed concurrently herewith and are assigned to a common assignee of the present application.

Figure 2:
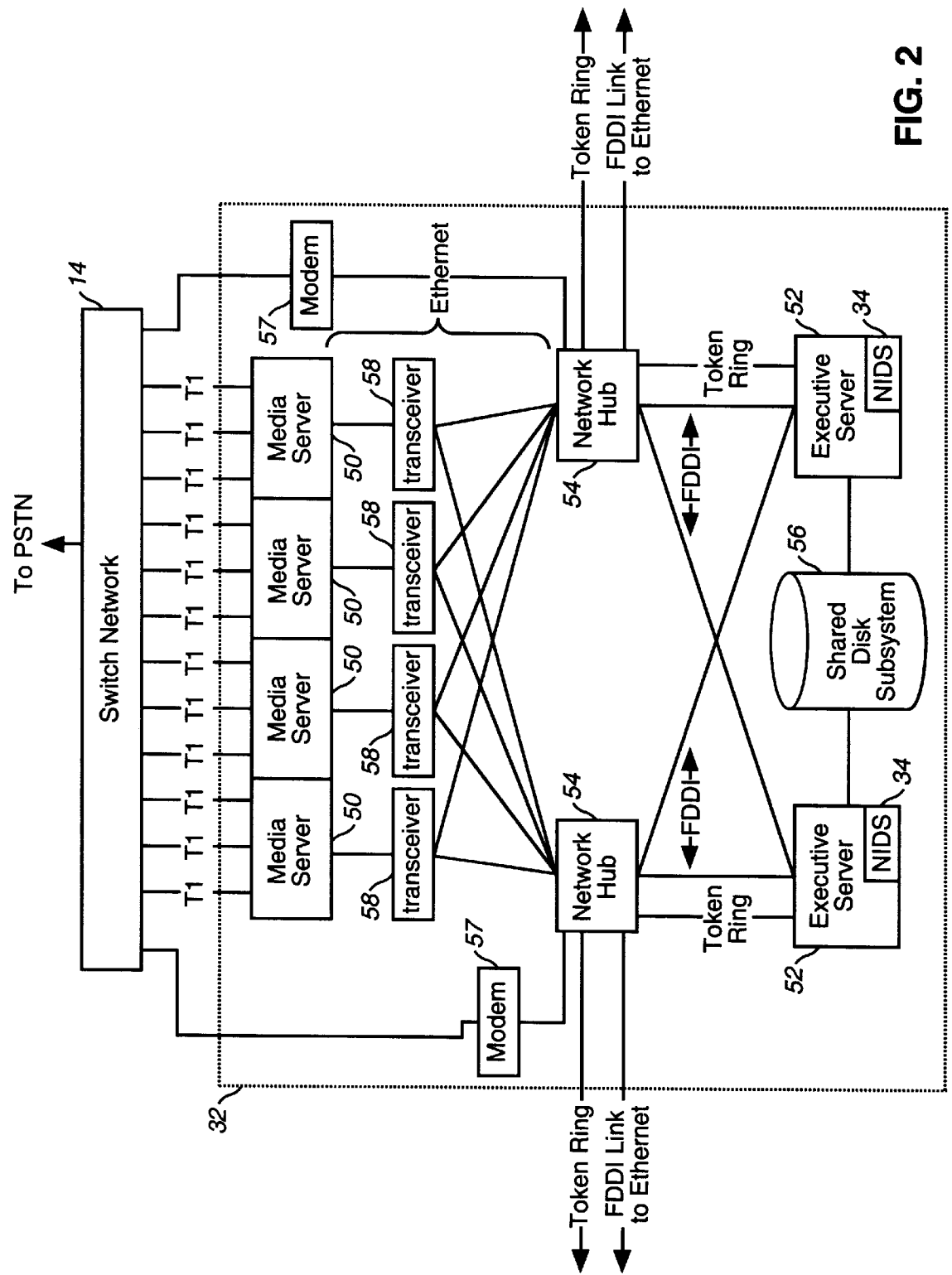
FIG. 2 is a block diagram showing details of an integrated voicemail and faxmail platform for the system of FIGS. 1A and 1B.

Referring to FIG. 2, the VFP 32 is shown as having five media servers 50 coupled to two executive servers 52 through two network hubs 54. The multiple media servers 50, executive servers 52, and network hubs 54 provide for redundancy and capacity requirements, as described herein. The media servers 50 provide an interface with the switch network 14. The switch network 14 is coupled to a telecommunications network, such as a public switch telephone network (PSTN). Multiple T1 lines couple the switch network 14 with the media servers 50. Each T1 line transmits voice and fax calls to T1 ports on the media servers 50. Each media server 50 is typically a high-grade computer with a telephony network interface and digital signal processing to process voice and fax calls, operating similar to an ARU, and which typically supports three or more T1 ports. Each media server 50 can also include speech recognition capabilities and/or text-to-speech capabilities.

As described herein, each media server 50 plays recorded messages for callers, prompts callers for input, and collects DTMF digits as caller input. Each media server 50 also detects fax tones and receives fax messages in response thereto. The media servers 50 receive all calls to the VFP 32. The media servers 50 then perform script processing, as described herein, and in the above-referenced applications, and record callers' voice messages, receive faxes, or receive and stores other data as described herein. As a result, each media server 50 performs call flow processing, as described herein. The media servers 50, in the exemplary embodiment, store in random access memory (RAM) files for all scripts and prompts performed by the VFP 32, although the media servers 50 can retrieve the scripts and prompts directly from the shared disk subsystem 56.

In the exemplary embodiment, the media servers 50 are implemented on Multiserve 4000 platforms, manufactured by Texas Instruments, each of which consist of four server components. While the Multiserve 4000 platform can be configured to run three of the four server components as media servers, and one server component as an executive server, all four of the servers within each Multiserve 4000 platform operate as media servers in the exemplary embodiment. The architecture of the media servers 50 is scaleable, and thus, additional servers and entire platforms can be added to compensate for increasing traffic volumes. Additionally, while two network servers 52 and two network hubs 54 are shown in FIG. 2, the VFP 32 can employ fewer or greater number of executive servers and network hubs depending upon traffic volumes and other factors.

The two executive servers 52 perform subscriber account and database management for the VFP 32. The executive servers 52 also perform global functions, such as billing, alarm management, message distribution and scheduling. As a result, the executive servers 52 serve hundreds or even thousands of gigabytes of voice and image data and thousands of ports from the media servers 50. Thus, the executive servers 52 operate more quickly and can be clustered for performance or redundancy, in general contrast to the media servers 50. The executive servers 52 can be considered service control points, except that call flow routines are performed by the media servers 50. The executive servers 52 may also be considered backend processors, because the executive servers perform much of the processor-intensive work in the VFP 32, such as manipulating and storing data, and preserving data integrity on the network.

In the exemplary embodiment, each executive server 52 includes a DEC Alpha 8200 Server. Each executive server 52 has resident thereon a NIDS 34, which stores, among other things, subscriber profiles. As noted above, the NIDS 34 employed by the VFP 32 is a database that is slightly different from the database of the NIDS 27 or NIDS 36. However, to allow the ARU 20 to access the profile and information stored in the database of the VFP 32, a NIDS style interface is preferably built on top of the underlying database employed by the VFP 32. Therefore, as described herein, the VFP 32 employs the NIDS 34.

Once data is collected by the NIDS interface, it is stored in the Informix database. The executive servers 52 are redundant, to provide not only processing load sharing but also for failover. Thus, one server 52 is configured to compensate if the other server fails or suffers a fault. In the exemplary embodiment, one of the executive servers 52 monitors the status of the other executive server, under one of known high availability products, such as DECSafe. Alternatively, one of the executive servers 52 can be active, while the other executive server performs simultaneous, redundant functionality, and is configured to immediately compensate for, or provide "hot cut-over," if the first executive server fails.

A shared disk subsystem 56 is coupled by means of a small computer system interface (SCSI) to each of the executive servers 52 and provides permanent data storage for databases employed by the VFP 32. The databases for the VFP 32 contain all data for each subscribers' mailbox or account, including voicemail messages, faxmail messages, and can include subscriber configuration data and personalized greetings and prompts. As a result, the shared disk subsystem 56 provides a centralized data store of all account data for the VFP 32. In the exemplary embodiment, all voicemail and faxmail messages, possibly with greetings and prompts, are stored in the shared disk subsystem 56 as object files. The executive servers 52 provide data updates, save, delete, and retrieval functions for accounts stored in the shared disk subsystem 56. Thus, the shared disk subsystem 56 provides for centralized data store and management of all account data for the VFP 32.

Rather than employing the single shared disk subsystem 56, a separate server can be placed at each telecommunications service providing location. Internet service providers (ISP's) are implementing a project known as the Large Object Management (LOM) project, which defines a network based approach to data storage. By employing the single shared disk subsystem 56, the VFP 32 employs a LOM-like approach which reduces costs of redundant hardware facilities distributed throughout the platform 10 or within the telecommunications network. As with other elements within the VFP 32, the shared disk subsystem 56 can be scaled to handle changing traffic capacity.

In general, the executive servers 52 perform at least nine functions. First, the executive servers 52 update subscriber configuration data, possibly including subscriber profiles, such as VFP profiles (described below). Updates for subscriber configuration data are received from the media servers 50, as subscriber input over telephone lines, or from the ARU 20, NIDS 27, 34 and 36, or mainframe profile management system 40, via the network hubs 54. Second, the executive servers 52 control storage of voice messages and fax images within the shared disk subsystem 56. Third, the executive servers 52 schedule and manage outgoing jobs, such as distribution of messages/faxes. Fourth, the executive servers 52 collect billing records, format such records, and submit the records to appropriate billing systems (not shown) as described below. Fifth, the executive servers 52 collect alarms issued by the VFP 32 and forward the alarms, via the network hubs 54, to an alarm management system (not shown). Sixth, the executive servers 52 monitor output ports of the VFP 32 to schedule any outgoing jobs for other elements of the platform 10. Seventh, the executive servers send pager notification for voicemail and faxmail messages. Eighth, the executive servers send status pages of voicemail and faxmail counts. Ninth, the executive servers send fax via electronic mail to the subscriber's electronic mail address.

The network hubs 54 provide all communications interfaces for the executive servers 52. The network hubs 54 can be Bay Network, Cabletron, or similar-type network bridging and routing hubs. The network hubs 54 preferably provide both fiber distribution data interfaces (FDDI) and switched 10 bT connectivity, and have multiple switched Ethernet ports. The network hubs 54 thus provide bridging and routing functions for diverse network technologies. For example, the media servers access the network hubs 54, via transceivers 58. The transceivers 58 couple to the network hubs 54 via Ethernet connections. In the exemplary embodiment, each transceiver 58 couples to both network hubs 54, thereby providing a redundant pair of switched Ethernet ports for each transceiver. Because each Ethernet port is a switched port, each media server 50 has a dedicated 10 Mb bandwidth line to the network hubs 54.

The executive servers 52 couple to the network hubs 54 by means of FDDI or other suitable interfaces. As compared to the media servers 50, the executive servers 52 require a much larger bandwidth connection to the network hubs, so as to handle the numerous, smaller 10 Mb Ethernet links from the media servers 50 to the network hubs 54. Again, each executive server 52 couples to both network hubs 54 in the exemplary embodiment. The network hubs 54 provide external connectivity for the VFP 32 to both the Ethernet 26 and the token ring LAN 38 (FIG. 1A). The media servers 50 access the executive servers 52 to send data to, and receive from, the shared disk subsystem 56, digitized voicemail and faxmail messages. The FDDI interfaces between the network hubs 54 and the executive servers 52 provide such access, while also providing a connection between the executive servers and the Ethernet 26.

As noted herein, the ARU 20 and operator console 28 issue queries to the VFP 32 for mailbox status or call context information, such as retrieving an automatic number identification (ANI) attached to a given voicemail message, as explained below. The VFP 32 may also query the ARU 20 or operator console 28 for call context information. Such communications between the VFP 32, ARU 20, and operator console 28 are performed via the Ethernet 26 (FIG. 1A). The network hubs 54 receive all queries from the ARU 20 or operator console 28, and the hub routes such queries to the executive servers 52. The executive servers then access the appropriate data in the shared disk subsystem 56, and respond via the network hubs 54 and Ethernet 26, to the ARU 20 or operator console 28.

As noted above, the network hubs 54 also provide token ring connectivity between the VFP 32 and the token ring LAN 38, so that the executive servers 52 may access the mainframe profile management system 40. Updates made to a subscriber profile elsewhere in the platform 10 are recorded in the mainframe profile management system 40. Thereafter, the mainframe profile management system 40 routes updates to the NIDS 27 and 36, and the NIDS 34 resident on the executive servers 52. Therefore, the network hubs 54 also provide a token ring connection to each executive server 52 to support such profile management. Alternatively, the executive servers 52 each include appropriate token ring hardware to permit the executive servers to connect directly to the token ring LAN 38.

In the exemplary embodiment, one or more modems 57 are coupled between the switch network 14 and the network hubs 54. The network hubs 54 include a terminal server (not shown) to facilitate connectivity between the VFP 32 and the modem 57. The modems provide connectivity between the VFP 32 and a paging company or service. As described below, the VFP 32 provides callback or paging to notify subscribers when they receive new voicemail and/or faxmail messages, and to send status pages for voicemail and faxmail message counts.

Figure 3:
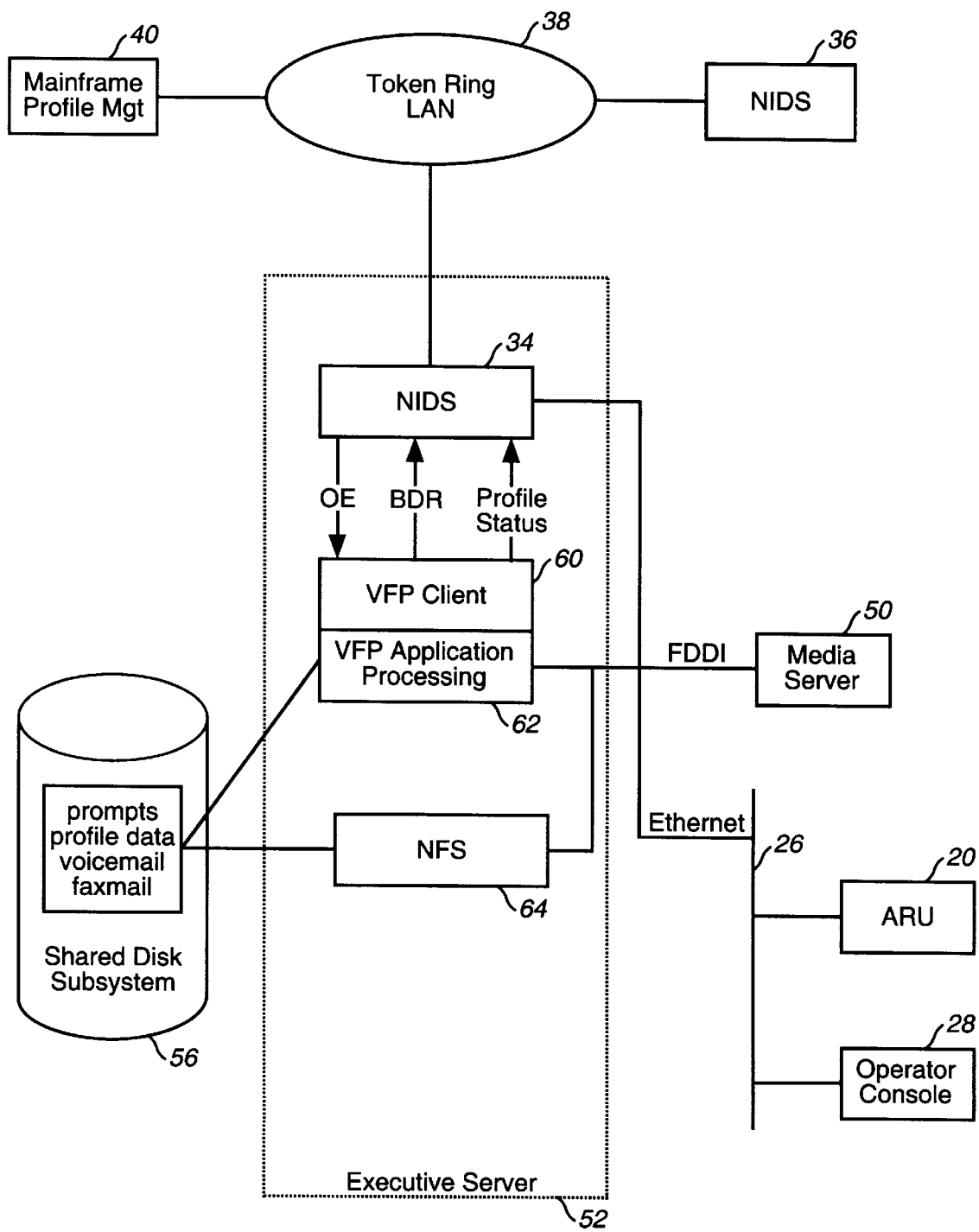
FIG. 3 is a block diagram showing details of an executive server for the integrated voicemail and faxmail platform of FIG. 2.

Referring to FIG. 3, the logical architecture of one of the executive servers 52, including its connection with the platform 10 is shown. The architecture is logical, in that one or more server components can be realized on a computer sharing resources (e.g., memory, processors, etc.). As noted above, the NIDS 34 resident on each executive server 52 stores subscriber profiles and receives profile updates from the mainframe profile management system 40. The NIDS 34 receives subscriber profile updates, represented as order entries (OE), and passes the OEs to a VFP client process 60 of the executive server 52. A VFP application processing system 62 communicating with the VFP client 60, receives the profile updates from the VFP client and executes an appropriate update of the subscriber profile in the shared disk subsystem 56. In the exemplary embodiment, the NIDS 34 stores subscriber VFP profiles. Subscriber VFP profiles describe individual configurations of a subscriber's account, and greetings or prompts that are subscriber customized (e.g. personalized greeting). Additionally, the subscriber VFP profiles can include subscriber specific paging information, such as subscriber's paging numbers, routing characteristics to a paging company, etc.

The VFP application processing system 62 creates billing data records (BDR) for each call that the VFP 32 processes. In other words, the media servers 50 generate call records for each call they handle. The call records are then sent over the Ethernet (via transceivers 58), through the network hubs 54 and FDDI to the executive servers 52. The executive servers then convert the call records to a standard BDR format. Thus, the executive server 52 creates BDRs to bill for the services the VFP 32 provides. The BDRs detail the services offered and the receiver of such services, such as individual subscribers. After creating a BDR, the VFP application processing system 62 sends the BDR to the NIDS 34. The NIDS 34, in turn, routes the BDR to the downstream billing system, via the token ring LAN 38.

The VFP application processing system 62 also receives subscriber account queries from the media server 50. In response thereto, the VFP application processing system 62 accesses the appropriate subscriber account in the shared disk subsystem 56 and routes the data back to the media server 50. The VFP application processing system 62 furthermore receives voicemail or faxmail messages from the media server 50. In response thereto, the VFP application processing system 62 stores such messages in individual subscribers' accounts in the shared disk subsystem 56.

A network file system (NFS) 64 logically maps the database of the shared disk subsystem 56 to external components. The NFS 64 employs known logical mapping methods for logically mapping network drives, and thus, maps server drives to a client's personal computer file system. The NFS 64 provides logical mapping of the shared disk subsystem 56 to the media servers 50 to thereby allow the media servers to simply issue a query to the database of the shared disk subsystem. The query is received by the network hub 54 (not shown in FIG. 3) from the Ethernet 26, and passed to the NFS 64 by the network hub over the FDDI link. In response thereto, the NFS 64 accesses the appropriate data in the database of the shared disk subsystem 56 to retrieve and forward the requested data. Thus, each of the media servers 50, which can also employ their own NFS, access information stored on the shared disk subsystem 56 via the NFS 64 resident on the executive server 52 as if information stored within the shared disk subsystem were stored on the media server.

In general, the shared disk subsystem 56, in the exemplary embodiment, is partitioned into one portion which stores voice and facsimile messages, and another portion which contains the subscriber profiles and other database information. The voice and facsimile messages in the first portion are shared with the media servers 50 via the NFS 64. When a message is first received by the VFP 32, the messages are stored locally, such as on the media server 50. Thereafter, the media server 50 notifies or updates the database information within the shared disk subsystem 56. Thereafter, the message is stored on the shared disk subsystem 56. Thus, incoming messages or files are buffered on the media server 50 in real time, and once collection of such files is complete, the entire file is transferred to the executive server 52 for storage in the shared disk subsystem 56.

The ARU 20 and/or operator console 28 can query the VFP 32 for information stored in the database of the shared disk subsystem 56, as noted above. Specifically, the ARU 20 and operator console 28, via the Ethernet 26, submit a query to the NIDS 34 of the executive server 52.

III. System Operation

Referring to the flowcharts of FIGS. 4A and 4B, an exemplary routing of a call to the VFP 32 will be described. The flowcharts of FIGS. 4A–4B chronologically present the steps performed by the ARU 20 and VFP 32, respectively. In step 102, of a routine 100, the ARU 20 receives a call from the call originator 12. The call requests either to send or leave a voicemail for the subscriber or transmit a facsimile message ("faxmail") to the subscriber. For a faxmail message, the ARU 20 may monitor the call to detect fax tones and determine if the call is a facsimile transmission. Alternatively, the ARU 20 listens for a period of time on an incoming call for fax tones (e.g., CNG tones). If such tones are detected, the ARU 20 assumes that the incoming call is a facsimile transmission. As a result, the ARU 20 sends the call to the VFP 32 under mode (3) noted below.

In step 104, the ARU 20 places a call to the VFP 32. In the exemplary embodiment, the ARU 20 places a call to the VFP 32 on a dedicated access line, such as the FGD trunks 33; however, other dedicated links between the ARU and the VFP can be employed. The ARU 20 places the call to the VFP 32 using a single specific telephone number (800 or 888 number) for communicating between the ARU and VFP. Specifically, the ARU 20 places a call over a DS-0 channel on a T1 trunk to the VFP 32 through the switch network 14. One of the media servers 50 accepts the call, and the switch network 14 outpulses the subscriber's 800 number and the caller's ANI.

In step 206 of a routine 200, the VFP 32 receives the call from the ARU 20 and goes off hook (FIG. 4B). In particular, the media server 50 receives the call from the ARU 20 via the switch network 14, and then goes off hook for the particular DS-0 channel on one of the T1 trunks. In step 108, the ARU 20 determines that the VFP 32 answered the call (FIG. 4A), using known trunk signaling techniques. In step 110, the ARU 20 transfers the subscriber's mailbox identification (ID) number and a mode ID over the now-established link with the VFP 32. The ARU 20, in the exemplary embodiment, employs in-band signaling, such as DTMF to transfer the ID number and mode ID.

The mailbox ID typically is the subscriber's single telephone number. The mode ID specifies one of six types of incoming calls for the VFP 32. For guest callers who call the subscriber, three modes are possible: (1) depositing or leaving a voicemail, (2) depositing or leaving a faxmail using DTMF input to the ARU 20, or (3) automatically leaving a faxmail. Under mode (2), the guest caller typically calls from a telephone handset connected to a facsimile machine and selects a DTMF option to begin transmission of a faxmail message, while in mode (3), the guest caller automatically sends a faxmail message via a fax machine without first using a telephone handset. If the subscriber is calling, the subscriber also has three modes: (1) retrieving or sending voicemail or faxmail, (2) maintaining or updating broadcast lists for distributing voicemail or faxmail, and (3) modifying scripts or prompts which are replayed by the platform 10 for guest callers who may call the subscriber.

In step 212, the VFP 32 receives the mailbox ID and mode ID from the ARU 20 (FIG. 4B). In step 214, the VFP 32 confirms that the mailbox ID is valid. In particular, the executive server 52 accesses the shared disk subsystem 56 via the database based on the received mailbox ID to confirm that the mailbox ID correlates with an existing account stored in the shared disk subsystem via the database. For example, the media server 50 issues a query to one of the executive servers 52, via the Ethernet connection to one of the network hubs 54, and then via the FDDI connection to the executive server. The executive server 52 uses the subscriber's single telephone number to access his or her account on the shared disk subsystem 56 via the database. In step 216, the VFP 32 outpulses using DTMF a confirmation message over the link to the ARU 20.

In step 118, the ARU 20 receives the confirmation message from the VFP 32 (FIG. 4A). In step 120, the ARU 20 then releases the received call to the VFP 32. Thereafter, in step 222, the VFP 32 processes the call according to the mode ID previously received (FIG. 4B). For example, if the mode ID indicates that a guest caller is calling to leave a voicemail, the media server 50 can play a prerecorded subscriber customized greeting to the caller, and thereafter receive the caller's voicemail message under a predetermined call flow processing script. Alternatively, if the media server 50 determines that a fax message is being sent, then the media server performs essentially the same process as for a voicemail message, except that it plays no greeting or prompt.

After the call is transferred to the VFP 32, the media server 50 stores voicemail messages as voice object files on the media server's associated local disk storage device until the call is complete. Thereafter, the media server 50 establishes a communications channel and transfers the object file to the executive server 52 via the NFS 64. After receiving the voice object file, the executive server 52 records the caller's message and stores it in the subscriber's mailbox within the shared disk subsystem 56. Thus, the caller's message is recorded and stored in real time on the media servers 50, but not stored in real time in the shared disk subsystem 56. The executive server 52 also attaches to the message the caller's ANI, which was received by DTMF input from the caller.

If the mode ID indicates that the call is a fax transmission, then the media server 50 conducts an appropriate protocol handshaking with the fax sending system. Thereafter, the media server 50 receives the fax. The fax data stream is stored as an object file and handled in the same manner by the media server 50 and the executive server 52 as a voice message. Again, the executive server 52 stores the fax message as an object in the subscriber's mailbox within the shared disk subsystem 56.

If the mode ID indicates that the subscriber wishes to modify his or her broadcast lists, then the executive server 52 performs an appropriate script which provides prompts to the subscriber. In response to such prompts, the subscriber inputs DTMF responses and/or voice responses to modify his or her broadcast lists. The executive server 52 receives the subscriber input and modifies the subscriber's profile accordingly. Scripts for receiving and storing voicemail and faxmail, forwarding voicemail and faxmail, modifying distribution lists and modifying subscriber prompts or recordings ("call flow processing") are conventional, and are thus not described in detail herein so as to avoid obscuring embodiments of the present invention.

Figure 5A:
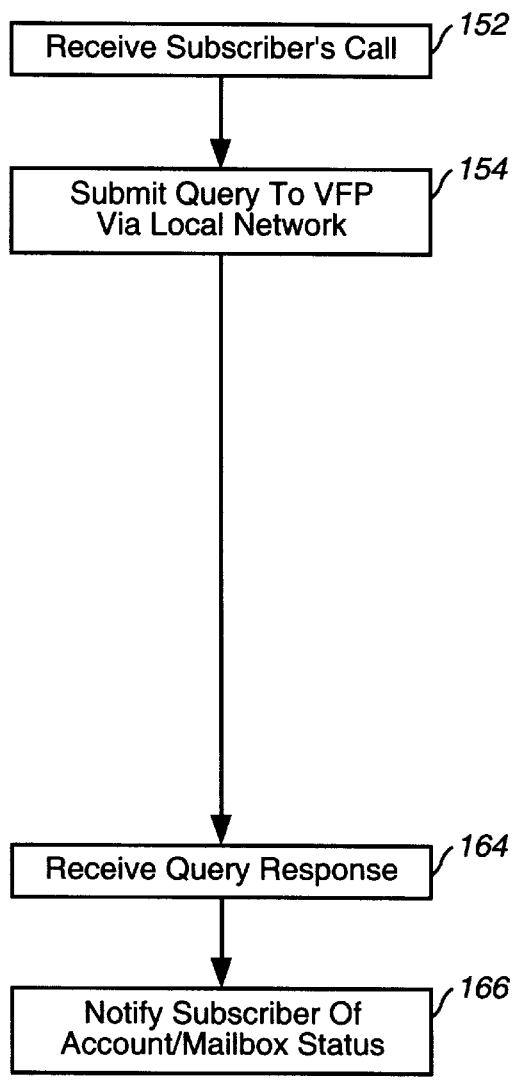
FIGS. 5A and 5B are flow diagrams showing the steps performed by the ARU and VFP of FIG. 1A, respectively, during receipt of a subscriber's call.
Figure 5B:
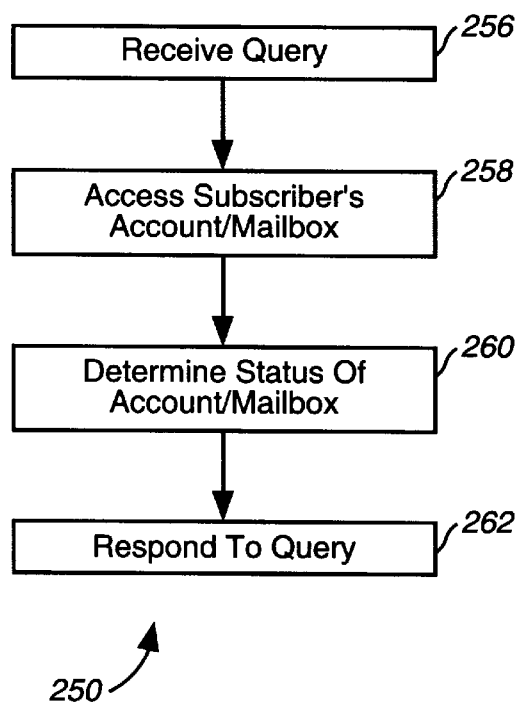

Referring to FIGS. 5A and 5B, exemplary flowcharts for an alternative embodiment of data exchange between the ARU 20 and VFP 32 are shown when the platform 10 receives a call from a subscriber. Again, the flowcharts of FIGS. 5A and 5B chronologically present the steps performed by the ARU 20 and VFP 32, respectively. Certain specific operations of the steps performed under the flow charts of FIGS. 5A and 5B are similar to the steps described above, and therefore, such specific details are omitted in the following discussion for brevity and to avoid obscuring the embodiments of the present invention.

In step 152 of a routine 150, the ARU 20 receives a call from a subscriber of the telecommunications services provided by the platform 10. In step 154, the ARU 20 submits a query to the VFP 32 via the Ethernet 26. In step 256 of a routine 250, the VFP 32 receives the query (FIG. 5B). Specifically, the NIDS 34 of the executive server 52 receives the query from the Ethernet 26. In response to the query, the executive server 52 in step 258, accesses the subscriber's account stored in the shared disk subsystem 56. In step 260, the executive server 52 determines a status of the subscriber's account. For example, the executive server 52 determines whether a subscriber has received any new voicemail or faxmail messages, and whether the subscriber has archived within the shared disk subsystem 56 old voicemail or faxmail messages. In step 262, the executive server 52 responds to the query with a message indicating the status of the subscriber's account.

In step 164, the ARU 20 receives the response to the query from the Ethernet 26 (FIG. 5A). In step 166, the ARU 20 notifies the subscriber of the status of his or her mailbox. For example, the ARU 20 provides a voice message prompt to the subscriber notifying the subscriber of the number of new voicemail and faxmail messages, and archived voicemail and faxmail messages.

As noted herein, and in the above-referenced applications, subscribers can create and manage broadcast lists, and thereby broadcast voicemail and faxmail messages to not only other subscribers to the services provided by the platform 10, but to guest callers. For example, a subscriber can specify a distribution list of coworkers, and thereby automatically route certain voicemail or faxmail messages to such coworkers, whether or not the coworkers are subscribers to the services provided by the platform 10. The subscriber can add or delete individuals to the broadcast list, create additional broadcast lists, and specify broadcast lists for certain voicemail and/or faxmail messages. Additionally, the VFP 32 provides functions to notify a subscriber of the status of his or her account, and to forward received messages. For example, a distributed voicemail message which is to be distributed to a subscriber can automatically call the subscriber. As a result, the VFP can place outbound calls and consolidates features with the single number communications service described herein. Furthermore, the VFP 32 may forward voicemail or faxmail messages to other voicemail or faxmail service providers under industry standards such as AMIS-A, AMIS-D, VPIM, OctelLink, etc., such as services not provided by the platform 10.

The VFP 32 also provides automatic callback functions in the exemplary embodiment. Under the automatic callback functionality, a guest caller leaves a message on the VFP 32, and the caller is provided with the option of entering their ANI via DTMF. If the caller selects this option, the VFP 32 records the ANI in its shared disk subsystem 56 with the associated message. When the subscriber reviews the message with the associated ANI, the subscriber is provided with the option of using the automatic callback function. If the subscriber selects this option, then the call is sent back to the ARU 20, from the VFP 32, using a function in the switch network 14 called re-origination. In re-origination, if the switch hears a "#" DTMF tone for 1.5 seconds, the switch offers the callback to the ACD 18. The ACD 18 then performs its typical incoming call processing to provide the call to the ARU 20. The ARU 20 thereafter identifies that the call had previously been received by the platform 10 (by accessing its NIDS 27), and sends a query to the VFP 32 to determine the active "callback" number for the subscriber. In response to the query, the VFP 32 accesses the shared disk subsystem 56 for the ANI previously recorded, and provides the ANI back to the ARU 20. Once receiving the ANI, the ARU 20 establishes the call between the subscriber and the guest caller or other location associated with the ANI.

In the exemplary embodiment, the VFP 32 performs paging as automatic notification to subscribers that they have received newly arrived messages (voicemail or faxmail). Additionally, the VFP 32 can provide mailbox status to subscribers via such paging. For example, the subscriber, via his or her pager, can request display of mailbox messages. The VFP 32 provides names or phone numbers of parties who have left messages for the subscriber, and an indication of the type of message (e.g., voicemail or faxmail). The pager can then provide a scrolling message of all the names/numbers of callers attempting to reach the subscriber. If callers have sent an email message to the subscriber, then the caller's Internet protocol (IP) or email address is displayed on the pager. The ANI, IP address or other data necessary for providing such notification to the subscriber's pager is provided to an appropriate paging company. The paging notification is performed similar to paging notification that is performed by the ARU 20. The media servers 50 send page messages to a paging company via the switch network 14. Alternatively, the media servers 50 communicate directly to the paging company via the modem 57. The modem interface provided by the modem 57 provides more reliable delivery of pages as well as the ability to issue alpha-numeric pages to subscribers.

In an alternative embodiment, subscribers can access the VFP 32 and request a list to be printed at a facsimile machine of all new messages received or archived, rather than an audio message notifying the subscriber of the number of new messages. Alternatively, the list can be delivered to a computer at a designated address (e.g., to an IP address) or routed to an appropriately addressed printer. The VFP 32 could also include the speech-to-text ("voice recognition") and text-to-speech routines to convert messages to desired formats. For example, the subscriber can request that a voicemail message be converted to text (e.g., ASCII text) and then faxed to the subscriber at a designated facsimile machine phone number. An email message can also be routed to a designated facsimile machine. Likewise, the subscriber can request email messages to be converted into audio format to be replayed to the subscriber over a telephone. Similarly, an audio portion of a video mail message can be converted to text and displayed on the subscriber's palm top computer. As a result, the VFP 32 can convert all electronic information messages into any format that the subscriber desires, and have that message forwarded to a desired number, IP address, etc.

Overall, while embodiments of the invention have been described above with respect to voicemail and faxmail messages, all electronic information messages can be supported under the present invention. The VFP 32 can store email messages in an email mailbox for the subscriber located in the shared disk subsystem 56. The subscriber's single phone number can act as the subscriber's email address (e.g., "800-555-6789 @ MCI.com"). The subscriber can listen to or receive selected email messages by replaying text-to-speech converting email headers (e.g., "from" and "subject" lines), as well as listening to the full body of the email message. The subscriber can reply to the email message by simply recording a voice message, which the VFP 32 converts to text and transmits to a designated recipient. The VFP 32 can employ voice navigation to permit the subscriber to enter commands orally. Furthermore, email messages can be transmitted to the subscriber on the subscriber's pager.

Conversely, subscribers can access the VFP 32 via their computer, rather than a phone. As a result, in an alternative embodiment, the VFP 32 includes a web server which permits the subscriber to access the VFP through the web server by employing a predetermined IP address. The subscriber can then retrieve audio messages using conventional audio streaming technology. Alternatively, audio messages can be converted to text and sent as email messages to the subscriber.

Although specific embodiments of, and examples for, the present invention are described herein, for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary telecommunications systems described above. For example, while embodiments of the present invention have been generally described above as being employed with the telecommunications platform 10, the present invention is equally applicable to other communications systems, such as a network of computers to receive, distribute and manage subscriber accounts (e.g., email accounts). While certain operations under embodiments of the present invention have been described as occurring generally in a serial fashion, those skilled in the relevant art will recognize that it is entirely within the scope of the invention to conduct some operations more or less simultaneously, or in another order from that described herein.

All of the above U.S. Patents and Applications are incorporated herein by reference as if set forth in their entirety. Embodiments of the present invention can be modified based on disclosed embodiments of the above U.S. Patents and Applications to provide yet further embodiments of the present invention.

These and other changes can be made to the embodiments of the invention in light of the above detailed description. In general, in the following claims, the terms used should not be construed to limit the invention to the specific embodiments disclosed in the specification and the claims, but should be construed to include any message receiving, storing and managing system that operates under the claims. Accordingly, the invention is not limited by the disclosure, but instead its scope is to be determined entirely by the following claims.

What is claimed is:

1. In a telecommunications network, an apparatus comprising:
   a plurality of telephony network interface servers, each interface server being coupled to receive voice and facsimile messages from the telecommunications network;
   a plurality of routing hubs coupled to the plurality of interface servers;
   a centralized mass storage device that stores subscriber accounts, each account for storing the voice and facsimile messages for at least one subscriber;
   a platform coupled to the routing hubs for providing single phone number access to a caller to multiple services on behalf of a subscriber to the services; and
   a plurality of management servers each coupled to the mass storage device and the plurality of routing hubs, wherein at least one management server routes incoming voice and facsimile messages for storage in accounts within the mass storage device, while at least another management server is configured to replace functionality of the at least one management server if the at least one management server experiences a fault.

2. The apparatus of claim 1, further comprising at least one modem coupled to at least one of the interface servers and to a paging facility, wherein the at least one of the interface servers forwards a paging request to a subscriber via the modem to provide notification to the subscriber.

3. The apparatus of claim 1 wherein the interface servers, under direction of at least one of the management servers, provides voice and facsimile messages to the at least one subscriber.

4. The apparatus of claim 1 wherein at least one of the management servers provides, based on a received query, notification of status of at least one subscriber account.

5. The apparatus of claim 1 wherein each account stored in the mass storage device corresponds to a single telephone number assigned to each subscriber.

6. The apparatus of claim 1, wherein, the services include:
   voice messaging services for facilitating voice messaging;
   facsimile messaging services for facilitating facsimile messaging; and
   an interface for interfacing the platform with the subscriber.

7. The apparatus of claim 1, further comprising:
   an automated response unit coupled to receive calls from the telecommunications network, and process calls according to subscriber specific records defining telecommunications service options, wherein the subscriber specific records are stored within the automated response unit; and
   a local area network coupled between the automated response unit and the plurality of routing hubs.

8. The apparatus of claim 1 wherein the telecommunications network includes a plurality of digital data trunks, and wherein the plurality of interface servers each include a telephony interface coupled to some of the plurality of trunks in the telecommunications network, and a digital signal processor for processing voice and facsimile messages according to predetermined call flow scripts.

9. The apparatus of claim 1 wherein the plurality of management servers each include a network distribution server for storing subscriber specific records defining telecommunications service options.

10. The apparatus of claim 1 wherein the plurality of management servers each include a voice and facsimile message client coupled to receive update requests to subscriber accounts, a voice and facsimile message processing application receiving the update requests from the voice and facsimile message client and accessing the subscriber accounts in the mass storage device.

11. The apparatus of claim 1 wherein the plurality of management servers each include a network file system coupled to the interface servers.

12. The apparatus of claim 1, further comprising:
   an automated response unit coupled to receive calls from the telecommunications network based on a single telephone number associated with a subscriber; and
   a local area network coupled between the automated response unit and the plurality of routing hubs.

13. In a telecommunications network, a method performed by an automated response unit comprising the steps of:

receiving a call from the telecommunications network;

determining a telecommunications service request based on a call;

establishing a communications link with an electronic information message server;

transferring subscriber information or requested service data to the message server, wherein the requested service data corresponds to the telecommunications service request, wherein said transferring provides single telephone number access to multiple services on behalf of a subscriber to the services;

receiving validation based on the subscriber information or requested service data; and providing the call to the message server.

14. The method of claim 13 wherein the step of receiving includes the steps of:

receiving a call from a subscriber having an account stored by the message server;

providing a query to the message server regarding a status of the account;

receiving a response to the query, wherein the response indicates a current status of messages stored in the account; and notifying the subscriber of the status of messages stored in the account.

15. The method of claim 13 wherein the message server maintains subscriber accounts, and wherein the step of determining includes the steps of:

determining if the call is from a subscriber or a guest caller;

if the call is from the guest caller, then determining if the guest caller wishes to leave a voice message, leave a facsimile message, or retrieve a facsimile message; and if the call is from the subscriber, then determining if the subscriber wishes to retrieve or send a voice or facsimile message, modify a personalized voice greeting associated with the subscriber's account, or modify a broadcast list, wherein the broadcast list identifies recipients of voice or facsimile messages.

16. The method of claim 13 wherein the step of establishing includes the steps of:

placing a call to the message server via the telecommunications network; and determining that the message server received the placed call.

17. The method of claim 13 wherein a subscriber has a single telephone number, and wherein the step of transferring includes the step of providing the single telephone number to the message server.

18. The method of claim 13 wherein the message server maintains subscriber accounts, and wherein the step of determining includes the step of determining if the caller wishes to leave a video mail or electronic mail message.

19. The method of claim 13 wherein the step of providing includes storing an electronic information message in a subscriber account, and wherein the method includes automatically notifying the subscriber that the message has been stored.

20. The method of claim 13 wherein the step of providing includes:

storing an electronic information message for a caller; and providing a list of identifying data strings to a pager, wherein each string identifies a message stored for the subscriber.

21. The method of claim 13 wherein the step of providing includes storing an electronic information message for the subscriber, and wherein the method includes converting the electronic information message to another format differing from a format of the stored electronic information message, and providing the alternate format message to the subscriber.

22. In a telecommunications network, a method performed by a message server comprising the steps of:

establishing a communications link with an automated response unit in response to a call received from the telecommunications network;

receiving subscriber information or requested service data, wherein the requested service data corresponds to the telecommunications service request associated with the received call, and wherein said requested service provides single telephone number access to multiple services on behalf of a subscriber to the services;

determining whether a subscriber account is satisfactory based on the subscriber information or requested service data; and providing a confirmation message to the automated response unit if the subscriber account is satisfactory.

23. The method of claim 22 wherein the step of receiving includes the steps of:

receiving a query regarding a subscriber account;

accessing the subscriber account; and providing a response to the query based on accessing the subscriber account.

24. The method of claim 22 wherein the message server maintains a subscriber account, and wherein the step of determining includes the steps of:

determining if the call is from the subscriber or a guest caller;

if the call is from the guest caller, then determining if the guest caller wishes to leave a voice message or leave a facsimile message and whether the subscriber account can accept additional messages; and if the call is from the subscriber, then determining if the subscriber wishes to retrieve or send a voice or facsimile message.

25. The method of claim 22 wherein the subscriber has a single telephone number, wherein the message server maintains a subscriber account associated with the single telephone number, and wherein the step of determining includes the steps of determining whether the subscriber data corresponds to the single telephone number associated with the subscriber account.

26. The method of claim 22 wherein the subscriber has a single telephone number, and wherein the step of receiving includes the step of receiving the single telephone number.

27. The method of claim 22 wherein the step of receiving includes receiving a facsimile message, voicemail message, video mail message, or electronic mail message.

28. The method of claim 22, further comprising the steps of:

storing an electronic information message for a caller; and providing a list of identifying data strings to the subscriber, wherein each string identifies a message stored for the subscriber.

29. The method of claim 22 wherein the step of receiving includes receiving an electronic information message for the subscriber and wherein the method further includes converting the electronic information message to another format differing from a format of the received electronic information message, and providing the alternate format message to the subscriber.

30. In a telecommunications network, an apparatus comprising:

a plurality of telephony network interface servers, each interface server being coupled to receive voice and facsimile messages from the telecommunications network;

a plurality of routing hubs coupled to the plurality of interface servers;

a centralized mass storage device that stores subscriber accounts, each account for storing the voice and facsimile messages for at least one subscriber, wherein each account stored in the mass storage device corresponds to a single telephone number assigned to each subscriber; and a plurality of management servers each coupled to the mass storage device and the plurality of routing hubs, wherein at least one management server routes incoming voice and facsimile messages for storage in accounts within the mass storage device.

* * * * *